Figure 1:
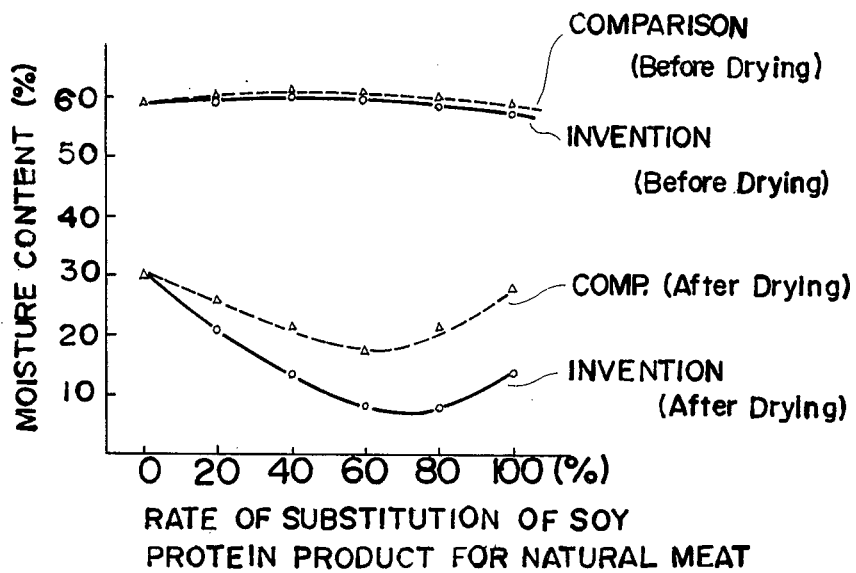

United States Patent [19]

Obata et al.

[11] 4,032,666

[45] June 28, 1977

[54] METHOD OF MANUFACTURING EDIBLE SOY PROTEIN-CONTAINING, DRIED MEAT PRODUCT

[75] Inventors: Shizuo Obata, Kashiwara; Yukiomi Yamato; Hitoshi Taniguchi, both of Osaka, all of Japan

[73] Assignee: Fuji Oil Company, Ltd., Japan

[22] Filed: Feb. 14, 1975

[21] Appl. No.: 550,049

[30] Foreign Application Priority Data

Feb. 18, 1974 Japan .............................. 49-19731

[52] U.S. Cl. ................................ 426/242; 426/646
[51] Int. Cl.² ............................................ A23B 4/04
[58] Field of Search ........................... 426/242, 646

[56] References Cited

UNITED STATES PATENTS

| 3,482,998 | 12/1969 | Carroll et al. ..................... 426/646 |
| 3,662,671 | 5/1972 | Frederiksen et al. .......... 426/506 X |
| 3,662,672 | 5/1972 | Hoer ............................... 426/506 X |

FOREIGN PATENTS OR APPLICATIONS 4,713,692  4/1972  Japan .............................. 426/646

*Primary Examiner*—Joseph M. Golian
*Attorney, Agent, or Firm*—Wenderoth, Lind & Ponack

[57] ABSTRACT

A method of manufacturing an edible soy protein-containing, dried meat product containing a fibrous soy protein product of fibril structure having a random orientation, and a natural meat. A mixture of the fibrous soy protein product and the natural meat is heat-treated and dried. The amount of the fibrous soy protein product must be not less than 10% by weight relative to the total weight of the natural meat employed.

7 Claims, 2 Drawing Figures

METHOD OF MANUFACTURING EDIBLE SOY PROTEIN-CONTAINING, DRIED MEAT PRODUCT

The present invention relates to a method of manufacturing edible soy protein-containing, dried meat products and, more particularly, to a method of manufacturing dried meat products containing edible soy protein products of fibril structure having a random orientation and edible natural meat.

For the purpose of temporary storage of meat products, one method heretofore extensively practised is to dry the meat products. Some of the dried meat products are served as dry food items and the other are cooked by heat prior to being served. Recent development and increasing consumption of ready-to-eat foods, or so-called "instant" foods, such as cupped noodles or spaghetti, articles of food and field rations, all capable of being 'cooked' and made ready for consumption adding, for example, boiled or hot water, has obviously invited an ever-increasing demand for dried meat products which can be employed as an addition to a major constituent of a particular instant food product. Most dried meat products used in the instant food products of the type referred to above are required to have common features such as availability at reasonable costs, capability of being stored for a relatively long period of time and good swellability or expansibility which means the capability of being expanded substantially to the original volume and/or form, not absolute though it may be, by absorbing boiled or hot water.

In fact, recently manufactured meat products are, because of technological development in the food industry, hard to taint during a substantial period of storage. However, recent trends are such that the price of, for example, beef, which is a major material for one particular dried meat product, has increased and will continue increase and, moreover, the beef cannot easily be dried without any difficulty because of a particular cellular structure thereof and, even if it is successfully dried, the resultant dried beef has poor swellability, consequently lacking a pleasing taste and mouthfeel.

Accordingly an essential object of the present invention is to provide a method of manufacturing edible soy protein-containing, dried meat products, which method can easily and efficiently be practised to provide at a relatively low cost the dried meat products having a reasonably good swellability as defined hereinabove and providing a pleasing taste and mouth feel comparable to that provided by natural meat.

Another important object of the present invention is to provide a method of manufacturing edible soy protein-containing, dried meat products, wherein a fibrous protein material of fibril structure having a random orientation, which is prepared from soy beans, is mixed with edible natural meat in an amount not less than 10% by weight relative to the total weight of the edible natural meat.

According to the present invention, since the natural meat is mixed with the fibrous protein material in an amount not less than 10% by weight relative to the total weight of the natural meat used, not only the mixture of the meat and the fibrous protein material can easily and readily be dried during the manufacture of the soy protein-containing, dried meat product, but also the soy protein-containing, dried meat product having a good swellability as defined hereinabove can be provided. Moreover, by the same token, the price of an instant food product which may otherwise employ an expensive natural meat as an addition to the major constituent thereof can substantially be reduced, if the dried meat product of the present invention is employed in place of the expensive natural meat, with no substantial reduction of the nutritive value.

A soy protein-containing, dried meat product itself is not unknown. However, the known dried meat product is prepared by mixing soybean protein material with one or more chemical agents, such as a binding agent, then processing the mixture under pressure such as by means of extrusion and finally heat-treating, and is primarily available in the form of a simulated meat, an agent for improving the quality of meat and/or a meat extender. In fact, extensive research and development has heretofore been conducted to practically utilize the known dried meat product in this form. In sufficient research has been conducted as to application of the soybean protein material mixing with a natural meat to thereby provide the dried meat product ready for eating because, it is supposed, the taste and mouthfeel of the resultant dried meat product can easily be fixed in view of the fact that a consumer treats or cooks it to swell in an arbitrary manner. However, there is an exception in that the Japanese Patent Publication No. 13692/1972, published on Apr. 25, 1972, discloses a method of manufacturing a dried meat product wherein a fibrous protein material is mixed with a natural meat by the use of a binding agent, the mixture being subsequently heat-treated and dried.

Figure 2:
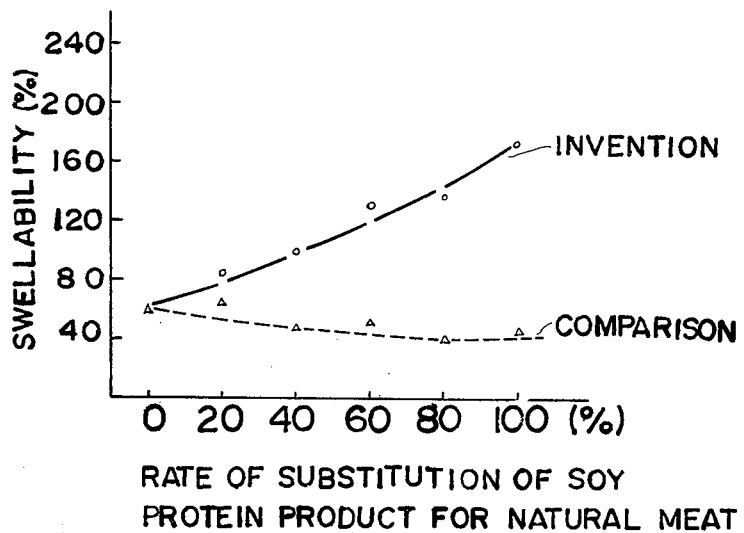

These and other objects and features of the present invention will become apparent from the following description taken in conjunction with a preferred embodiment thereof with reference to the accompanying drawings, in which:

FIG. 1 is a graph illustrating a relation between the rate of substitution of a soy protein-containing material for a natural meat and the content of residue moisture in the resultant dried meat product, and FIG. 2 is a graph illustrating a relation between the rate of substitution of a soy protein-containing material for a natural meat and the swellability of the resultant dried meat product in terms of the rate of increase of moisture absorbed thereby.

According to the method of the present invention, a portion or all of the natural meat is replaced by the fibrous protein product of fibril structure having a random orientation and, therefore, not only the price of the instant food product utilizing the dried meat product manufactured by the method of the present invention can advantageously be reduced, but also the fluid absorbability of the dried meat product can be improved. In other words, the fibril structure of the soy protein product contained in the resultant dried meat product contributes to improvement in the fluid absorbability. In addition to the fibril structure, the random orientation of fibers of the soy protein product facilitates binding of these fibers by intertwining with each other to provide a bulkiness in the resultant dried meat product and, therefore, it also contributes to improvement in fluid absorbability.

More specifically, the fibril structure, presented in each fiber of the soy protein product, and the bulkiness provided by an aggregation of the fibers of the soy protein product facilitate formation of voids and/or capillary vessels which enable a fluid medium, such as hot or boiled soup or water, to flow therethrough. The presence of the voids and/or capillary vessels results in the increased surface area of the resultant dried meat product, which consequently facilitates drying thereof during the manufacturing process, and the improved swellability.

The natural meat for the dried meat product of the present invention is normally employed in a minced or ground form to ultimately improve the fluid absorbability by increasing the surface area thereof. However, because of the cellular structure of the natural meat, the fluid absorbability of the natural meat, even though minced or ground, is relatively low as compared with that afforded by the bulky fibrous protein product of fibril structure. Therefore, according to the present invention, the ground natural meat is mixed with the fibrous, soy protein product so that the fibril structure and bulkiness of the soy protein product can act as means for assisting fluid absorption of the natural meat and facilitating drying thereof, whereby the resultant dried meat product has imparted thereto a quite excellent swellability.

Thus, it will readily be seen that the present invention is intended, not to employ the fibrous, soy protein product of fibril structure having a random orientation as a substitute for the natural meat, but to apply the excellent fluid absorbability of said fibrous, soy protein product to the natural meat to be mixed therewith.

The soy protein product of fibril structure having a random orientation, which is advantageously employed in the present invention, is substantially disclosed in any of the U.S. Pat. Nos. 3,662,671, and 3,662,672, both patented on May 16, 1972, and should be understood as meaning an aggregation of random-oriented soy protein filaments or fibers having a fibril structure, or similar fibers, which are, according to any of the foregoing U.S. patents, manufactured by preparing an aqueous slurry of a protein material, then continuously heating the slurry at a temperature of at least about 165° F under a pressure of above about 50 p.s.i.g. and finally extruding the heated slurry through an orifice. Therefore, the soy protein product utilizable in the practice of the present invention is quite different from an ordinary spun protein product and a textured protein product.

The spun protein product referred to above is usually manufactured by the known wet spinning process and represents a relatively close fibrous structure wherein fibers constituting the spun protein product, even though coagulated together, mostly extend parallel to each other so that binding of these fibers by intertwining, which is required to impart a bulkiness to the spun protein product, cannot be expected. Therefore, the spun protein product manufactured by the wet spinning process cannot advantageously employed in the practice of the present invention.

On the other hand, the textured soy protein product, though it exhibits an acceptable fluid absorbability similar to that of the fibrous, soy protein product, represents such a non-fibrous structure that the bondability by intertwining of textured protein structures cannot be promoted. Even if a relatively large amount of a binding agent, which is liable to impair the taste and mouthfeel of the resultant textured protein product, is admixed there-with, the resultant textured protein product can hardly be processed or molded into a desired shape.

The fibrous, soy protein product of fibril structure employed in the present invention, though it provides a pleasing mouthfeel even if used in various applications, exhibits a more pleasing mouthfeel if employed as a material for the soy protein-containing, dried meat product which is advantageously employed in an instant food product. This is because, even though the fibrous soy protein product is partially mixed with, or wholly substituted for, the natural meat with or without the addition of relatively small amount of binding agent and is subsequently mixed with one or a mixture of seasoning agents and flavors, the swellability of the resultant soy protein-containing dried meat product which is available when said dried meat product is immersed in water, greatly affects the pleasing mouthfeel.

In general, most instant food products can readily be cooked and are so attractive as to induce a consumer of any of the instant foods to try it by contacting with boiled or hot soup or water to let the constituents of the instant food to swell. The dried meat product of the kind used in this type of instant food must have such a good swellability so that it can restore substantially to the original volume and/or shape in a relatively short period of time immediately after it is subjected to hot or boiled soup or water. Accordingly, the soy protein-containing, dried meat product of the present invention, which has a reasonably excellent swellability, is comparable to the dried natural meat product which is recognized as having a low swellability.

As stated hereinabove, in the practice of the method of the present invention, in consideration of the fluid absorbability and the pleasing mouthfeel, the soy protein product of fibril structure having a random orientation is mixed with a ground natural meat. However, the amount of the soy protein product of fibril structure having a random orientation to be mixed with the ground natural meat should be not less than 10% by weight in order to obtain the soy protein-containing dried meat product which exhibits excellent characteristics. If the amount thereof is less than 10%, the soy protein product of fibril structure having a random orientation will not effectively act as a medium for facilitating fluid absorption and, therefore, the desired characteristics will not be imparted to the resultant dried meat product.

The soy protein product utilizable in the present invention may be wholly substituted for the natural meat. According to a series of experiments conducted by the inventors, it has been found that the greater the amount of the soy protein product of fibril structure to be mixed with the natural meat, the smaller the drying time required for the mixture of soy protein product and natural meat. However, it has also been found that the smallest drying time is attained when the proportions of the soy protein product of fibril structure is within the range of 60 to 80% by weight relative to the total weight of the natural meat and that, when the soy protein product of fibril structure is 100% substituted for the natural meat, the drying time is somewhat reduced. The swellability of the resultant dried meat product of the present invention increases as the amount of the soy protein product of fibril structure admixed increases.

Furthermore, according to the present invention, during the manufacturing process, the mixture of the soy protein product of fibril structure and the ground natural meat may contain one or a mixture of seasoning agents and/or other additives. Examples of the seasoning agents are sugar, soy sauce or soya, salt, sodium glutamate and others. The other additives may include one or a mixture of binding agents such as wheat flour, powdered soybean, casein, gelatine, sodium alginate, etc., one or a mixture of flavors, one or a mixture of texture improving agents, one or a mixture of oxidation preventing agents and other food additives.

The mixture is subsequently heat-treated after having been stirred. The heat-treatment is for the purpose of sterilization of the mixture and improvement of the taste of the resultant dried meat product. In the case where the binding agent is employed in the mixture of the soy protein product of fibril structure and the natural meat, the heat-treatment may be carried out to an extent that binding action of the binding agent can be accelerated. In general, insofar as the above mentioned purpose is involved, the heat-treatment is carried out at not less than 60° C. for 5 to 30 minutes under atmospheric pressure.

The heat-treated mixture is thereafter dried by a known drying method which may be a freeze-drying, hot air drying or microwave drying. The drying is carried out to the extent that the moisture content of the heat-treated mixture is not more than 10% and, in other words, the resultant dried meat product has a moisture content not more than 10%.

It has been found that the soy protein-containing dried meat product thus obtained by the method of the present invention exhibits excellent characteristics in terms of driness, swellability, and texture as compared with a similar dried meat product prepared from a mixture of textured protein product or spun protein product and natural meat or from 100% natural meat.

The method of the present invention will be more apparent from the following examples which are chosen from many specific combinations which are possible to illustrate the invention and are not to be construed as limiting the scope of the invention.

EXAMPLE I

For the purpose of comparision with this Example I as hereinafter described, a dried natural meat product was first prepared by mixing 80 parts of ground pork lean meat and 20 parts of ground pork fat with the addition of some seasoning agents and food additives for 3 minutes in a known meat mixer to provide a slurry of natural meat, the natural meat slurry being subsequently shaped to have a thickness of about 15 mm., then heat-treating the shaped slurry for 10 minutes under the steam of 100° C., and finally dried by the application of microwave radiation in a known manner. It is to be noted that the dried natural meat had a moisture content of 60% prior to being dried and that of about 30% after having been dried as shown in FIG. 1. It is further to be noted that, when the same dried natural meat had been adjusted so as to have a moisture content of 10% and after the adjusted dried natural meat had been immersed in a water of 100° C. for 4 minutes, it showed a swellability of about 60% as shown in FIG. 2.

According to the invention, soy protein-containing dried meat products wherein, of 80 parts of the pork lean meat referred to above, 16, 32, 48, 64 and 80 parts were respectively replaced by a fibrous soy protein product of fibril structure having a random orientation which is sold by Ralston Purina Company, U.S.A., manufactured in a substantially similar manner as hereinbefore described. Respective moisture contents of these soy protein-containing dried meat products of the present invention are plotted in FIG. 1. These soy protein-containing dried meat products were all adjusted so as to have the same moisture content of 10% and were subsequently immersed in a water of 100° C. for 4 minutes to find respective swellabilities which are plotted in FIG. 2.

From the graphs of FIGS. 1 and 2, it is clear that the soy protein containing dried meat product of the present invention can, during the manufacture thereof, be advantageously dried to a relatively low moisture content as compared with that of a similar dried meat product containing a commercially available textured soy protein product and that the soy protein containing dried meat product of the present invention exhibits a higher swellability than that afforded by the conventional dried meat product of a similar kind.

EXAMPLE II

For the purpose of comparison with this Example II as hereinafter described, a dried natural meat product was first prepared by mixing 80 parts of ground pork lean meat and 20 parts of ground pork fat with the addition of some seasoning agents and food additives for 3 minutes in a known meat mixer to provide a slurry of natural meat, the natural meat slurry being subsequently shaped to have a thickness of about 15 mm., then heat-treating the shaped slurry for 10 minutes under the steam of 100° C. and finally freeze-dried in a known freeze drier.

According to the invention in a soy protein-containing dried meat product wherein, of 80 parts of the pork lean meat referred to above, 40 parts were replaced by the fibrous soy protein product of fibril structure having a random orientation was manufactured in a substantially similar manner as hereinbefore described.

In a similar soy protein-containing dried meat product wherein, of 80 parts of the pork lean meat referred to above, 40 parts were replaced by a commercially available textured protein product was also manufactued in a substantially similar manner as hereinbefore described.

The result shown that the soy protein containing dried meat product of the present invention has a similar bondability as the dried natural meat. On the contrary thereto, the dried meat product containing the commercially available textured protein product tends to be broken into pieces.

EXAMPLE III

A slurry containing 80 parts of ground pork lean meat and 20 parts of ground pork fat which has been heat-treated in the manner as described in the Example I, a slurry wherein, of 80 parts of the ground pork lean meat 32 parts were replaced by the fibrous soy protein product of fibril structure having a random orientation according to the present invention, which has been heat-treated as in the Example I, and a slurry wherein, of 80 parts of the ground pork lean meat, 32 parts were replaced by the commercially available textured soy protein product, which has been heat-treated as in the Example I, were dried in a known freeze-drier for 3 hours to determine the difference in drying speed. The results show that, after three hour drying, the first mentioned slurry was dried to a moisture content of 18%, the second mentioned slurry was dried to a moisture content of 10.5% and the last mentioned slurry was dried to a moisture content of 23%.

From the foregoing full description of the present invention, it has now become clear that the employment of the fibrous soy protein product of fibril structure having a random orientation in an amount not less than 10% by weight relative to the total weight of the natural meat mixed therewith leads to a soy protein containing dried meat product which can exhibit excellent characteristics in respect of the swellability, mouthfeel, taste, drying properties and other properties, substantially as hereinbefore fully described and shown by the non-limiting examples.

What is claimed is:

1. A method of manufacturing an edible soy protein-containing, dried meat product, which comprises mixing a fibrous soy protein product of fibril structure having a random orientation, obtained by heating an aqueous slurry of a sufficiently reactive protein material at a temperature of at least 165° F under a pressure of about 50 p.s.i.g. and extruding the heated slurry through an orifice to produce said fibrous product, with a natural meat in an amount such that about 40 to 80% of the total weight of natural meat and soy protein is soy protein heat-treating the mixture of said fiber soy protein product and said natural meat at not less than 60° C for 5 to 30 minutes under atmospheric pressure and drying the heat-treated mixture to a moisture content of not greater than 10% whereby the dried mixture possesses increased swellability and texture when hydrated.

2. A method as claimed in claim 1, wherein during said mixing step, one or more food additives including seasoning agents are added.

3. A method as claimed in claim 1, wherein said drying is carried out by the application of microwave radiation.

4. A method as claimed in claim 1, wherein said drying is carried out by a freeze drying method.

5. A method as claimed in claim 1, wherein said natural meat is a mixture of ground pork lean meat and ground pork fat.

6. A process according to claim 1 wherein about 60 to 80% of the total weight of natural meat and soy protein is soy protein.

7. a method according to claim 1 wherein the natural meat is employed as ground meat.

* * * * *